(No Model.) 2 Sheets—Sheet 1.
R. R. SCHNEIDER.
BRAKE FOR ROAD ENGINES.
No. 395,003. Patented Dec. 25, 1888.
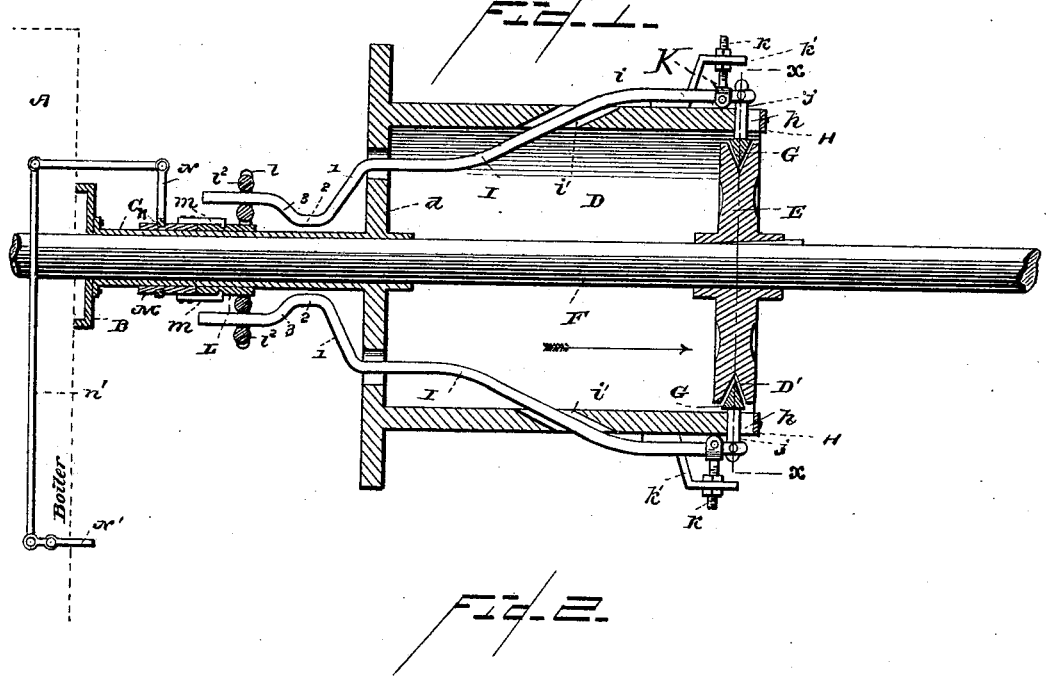
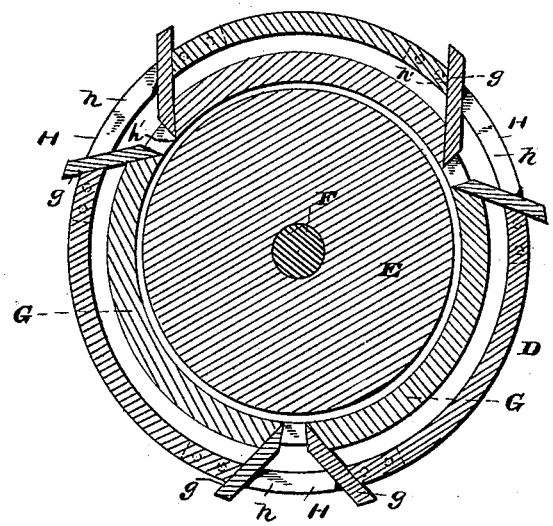
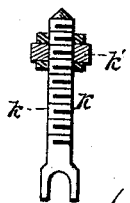
WITNESSES.
INVENTOR.
Robert R. Schneider
By Jas. H. Vermilya,
Attorney.

(No Model.) 2 Sheets—Sheet 2.
R. R. SCHNEIDER.
BRAKE FOR ROAD ENGINES.
No. 395,003. Patented Dec. 25, 1888.
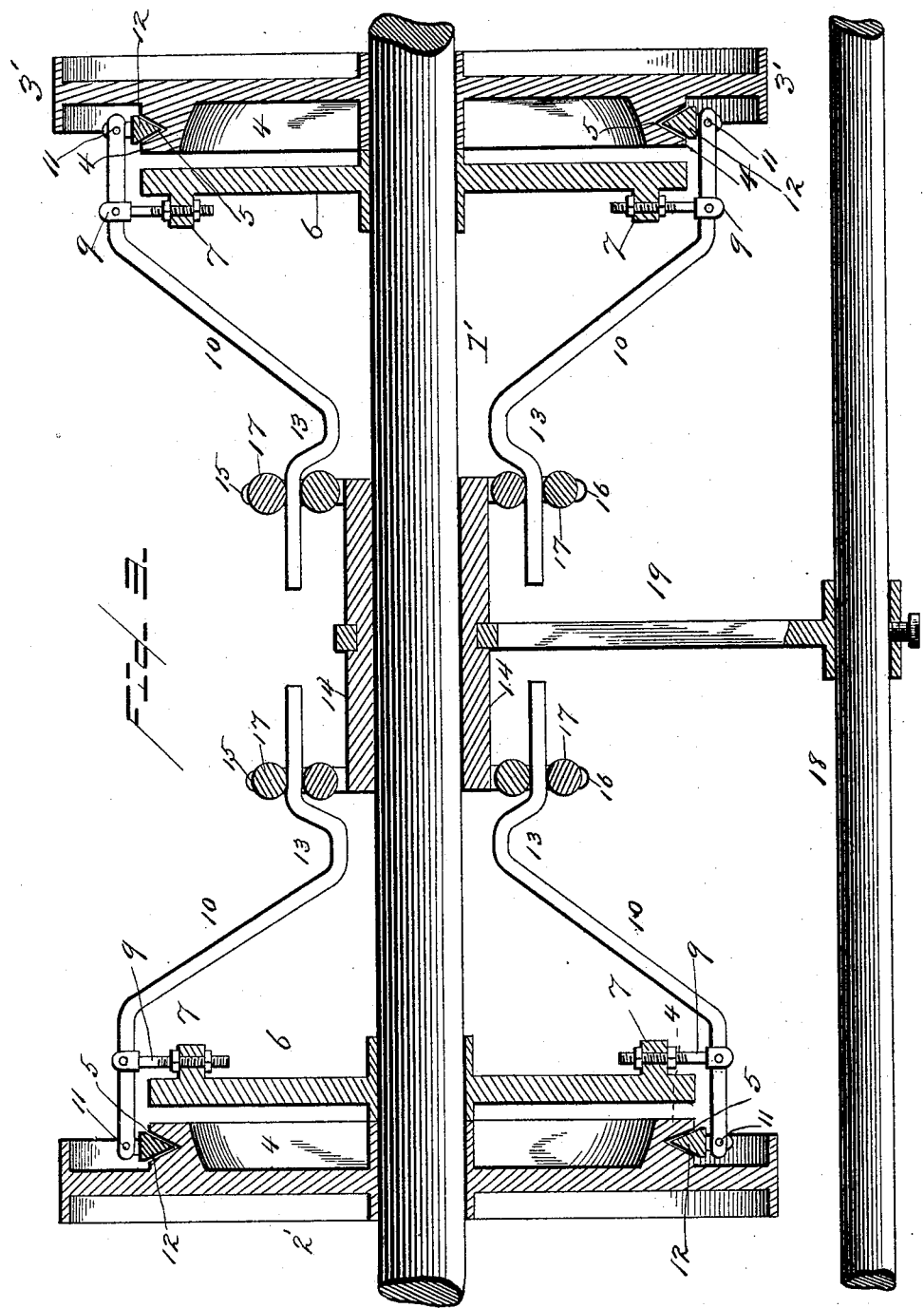
WITNESSES,
INVENTOR,
Robert R Schneider
By Jas. H. Vermilye
Attorney,

UNITED STATES PATENT OFFICE.

ROBERT R. SCHNEIDER, OF STILLWATER, MINNESOTA.

BRAKE FOR ROAD-ENGINES.

SPECIFICATION forming part of Letters Patent No. 395,003, dated December 25, 1888.

Application filed March 22, 1888. Serial No. 268,075. (No model.)

*To all whom it may concern:*

Be it known that I, ROBERT R. SCHNEIDER, of Stillwater, county of Washington, State of Minnesota, have invented a new and useful Improvement in Friction-Brakes for Traction or Road Engines, of which the following is a full, clear, and exact description, reference being had to the accompanying drawings, making part of this specification.

My invention relates to friction-brakes for traction-engines, counter-shafts, and the like; and it consists of the novel combination of devices and peculiar construction and arrangement of parts, as will be hereinafter fully described and claimed.

The object of my invention is to provide an improved friction-brake for traction-engines, counter-shafts, &c., which shall be capable of exerting greater power on a traction-wheel of an engine or the loose pulley of a counter-shaft to entirely overcome slipping of the same, while its capacity for effective work is materially increased and any side or lateral friction and wear between the operative parts in contact is entirely avoided.

In the accompanying drawings, Figure 1 is a central longitudinal sectional view through a friction device constructed in accordance with my invention and adapted for service on a traction or road engine. Fig. 2 is a transverse vertical section on the line $x\,x$ of Fig. 1. Fig. 3 is a longitudinal section of my improved friction-brake adapted for counter-shafts, and Fig. 4 is a detached detail view of parts of my improvement.

I will first proceed to describe my improved friction-brake as applied to and adapted for service in connection with a traction-engine, and afterward to a counter-shaft.

Referring more particularly to Figs. 1 and 2 of the drawings, A designates a portion of a boiler of a traction or road engine, to which is laterally secured a pillow-block, B, of any approved form. This pillow-block extends or projects laterally from one side of the boiler, and to it is secured a tubular or angular sided sleeve, C, which is fixed in place by any suitable appliances.

D is a drum or cylinder, which is arranged horizontally over and around the stationary sleeve and pillow-block, and concentric therewith. This cylinder has one end thereof, preferably the inner, closed by a head, $d$, which, as shown in Fig. 1, is made integral with the cylinder; but it is obvious that it may be firmly secured or united thereto, so that the cylinder is normally fixed or stationary. The opposite or outer end of the cylinder is open, as shown in Fig. 1, and in this open end of the drum is fitted a rotary friction disk or wheel, E, which is fixed to and revolves with a shaft, F, that passes centrally through the drum, and is journaled in the pillow-block B. This friction-disk has a V-shaped groove, $D'$, formed in its periphery, in which groove is seated a number or series of segmental shoe-blocks, G, which are disposed equidistant from each other around the peripheral groove in the friction-disk. These segmental shoes or blocks are arranged end to end, to embrace the friction-wheel equally and nearly cover the entire periphery thereof, with sufficient space between the shoes to properly clear one another, and the inner edges of the shoes are beveled to adapt them to fit snugly in the peripheral groove and closely embrace the friction wheel or disk. The shoes are arranged within the chamber of the stationary drum or cylinder at the outer end thereof, and they are all adapted to simultaneously reciprocate or play back and forth, toward and from the friction-disk in a space of suitable width between the drum and disk, the drum and disk being so proportioned and the shoes made of such transverse width that they can have the required amount of play to adapt them to entirely clear the disk when retracted therefrom. The shoes are guided in their movements by inclined guide-arms $g$, which are permanently secured to the ends of the shoes, and the arms of each shoe incline toward and approach one another. These inclined guides work in slots or recesses $h$, formed in the outer ends of the drum, and they are confined in place by bands or straps H, which are fixed to the edge of the drum over the slots or recesses therein. The ends of the slots or recesses are inclined, as at $h'$, and when the shoes have been forced far enough inward toward the friction-disk by the mechanism, presently described, to exert the required force on said disk and properly retard the same, the inclined guide-arms impinge against the inclined end walls of the recesses or slots $h'$, to thereby limit the inward play of the shoes.

To provide for simultaneous operation of the shoes and to force or press the same upon the friction-disk with equal power, which is necessary to avoid lateral or side friction on the said parts, I have a series of operating-levers, I—one for each shoe—which levers are all controlled and operated equally by a single device under the control of the engineer or attendant. These levers are arranged equidistant from each other around the drum, longitudinally thereof, and each lever is bent at an intermediate point of its length, as at $i$, to adapt the same to pass into the interior of the drum, each lever passing through a longitudinal slot, $i'$, formed in the periphery of the drum at a point between its ends. The rear ends of these operating-levers I are extended through the closed end of the stationary drum in transverse slots in the head $d$ thereof, and the extended rear ends of the levers are bent inwardly, as at 1, toward the shaft, then parallel therewith for a short distance at 2, and then outwardly from the shaft at 3, to thereby provide cam-surfaces 1 2 3 on the extreme rear ends of the levers, over which are adapted to ride suitable friction-rollers on an endwise movable sleeve to actuate the levers simultaneously, which I will describe at length hereinafter.

The front outer end of each operating-lever is arranged exteriorly to the drum, at the open end thereof, and terminates in close proximity to the shoe it is designed to operate, the lever being pivotally connected to a stud or projection, $j$, which is fixed centrally to the shoe and passes through a suitable aperture in the drum.

Each operating-lever is further pivoted at its outer end upon an adjustable fulcrum, K, which is preferably adjustable to vary the power of the levers, and thereby adapt the shoes to press with greater or less force on the friction-disk; but, if desired, the fulcrum may be permanently fixed to the drum. The fulcrum or pivot connection of the lever therewith is disposed in rear of the pivot intermediate the lever and the shoe operated thereby; and my preferred form of adjustable connection, as shown herein, consists of a threaded shank or stem, $k$, which passes through one end of a suitable support or bracket, $k'$, and is locked or held in place by means of jam-nuts, which are fitted on the shank and are screwed tightly against the fixed support or bracket.

A sliding sleeve, L, is fitted on the sleeve C, exteriorly to the stationary supporting-drum and in proximity to the cam-shaped ends of the operating-levers, and this sleeve carries a series of radial brackets or supports, $l$, one for each lever I, which passes at its rear end through one of the supports and between two friction-rollers, $l^2$, which are suitably journaled in the support and are adapted to ride upon and over the cam-shaped ends of the operating-levers, whereby all of the levers are simultaneously operated when the sleeve is adjusted.

In rear of the sleeve L is disposed a collar, M, which has secured thereto two or more plates, $m$, that project over the sleeve L and which have teats at their free ends that fit in an annular groove in the sleeve L, whereby the collar and sleeve are coupled together for simultaneous operation. The collar M has a peripheral groove, $n$, in which fits a bifurcated lever, N, that is operated by a rod, $n'$, running to a hand-lever, N', located at a suitable point on the engine within convenient reach of the attendant.

The operation of this part of my invention is obvious. When it is desired to retard the friction disk or wheel and the shaft to which it is fixed, the hand-lever is operated to force the coupled collar and carrying-sleeve toward the drum, which thereby causes the friction-rollers on the sleeve to ride upon the cam-shaped ends of the operating-levers and cause the latter to simultaneously press the segmental shoes upon the friction-disk with a regular uniform pressure, and to release the friction-shoes from the disk or wheel it is only necessary to reverse the hand-lever.

The power of the levers can be easily controlled and regulated by merely adjusting the fulcrums K thereof in the proper direction.

In Fig. 3 of the drawings I have shown a pair of my improved friction-brakes applied to adjoining loose pulleys on a counter-shaft to adapt said brakes to be alternately applied to one or the other of said pulleys, which I will now proceed to describe more fully.

The counter-shaft is designated by the numeral 1', and the loose pulleys by the numerals 2' and 3', which are of the ordinary class. On one of the lateral faces of each pulley is fixed or cast a friction rim or annulus, 4, that is of less diameter than the pulley, and which projects laterally from the same a suitable distance to enable a groove or channel, 5, to be formed in its periphery without materially affecting the strength of the friction-rim, which corresponds to the friction disk or wheel in the form of my invention shown in Figs. 1 and 2 as adapted for traction or road engines.

A supporting-disk, 6, is arranged in proximity to each of the loose pulleys, and these disks are fixed to the counter-shaft by any suitable appliances, so as to revolve therewith. A series of lugs, 7, (three in number, preferably,) are formed with or secured to the supporting-disks 6 on one of the lateral faces thereof near the periphery, and in each of these lugs are secured one of the adjustable fulcrums 9, to which is pivoted one of the operating-levers 10, the levers, fulcrums, and lugs corresponding in number. The levers are fulcrumed at an intermediate point of their length near the outer end thereof, and the free end of the lever is pivotally connected, as at 11, with a segmental brake-shoe, 12, which is supported by the lever and arranged in close proximity to the annular friction-rim of one of the loose pulleys, so as to fit in the peripheral groove of said rim, the groove and shoes being made substantially V-shaped in cross-section. The inner ends of the levers 10 approach the counter-shaft 1', and they are bent to form the cam-faces 13, which correspond to the bent portions 1 2 3 of the levers I. A sliding sleeve, 14, is fitted on the counter-shaft between the approximate ends of the two sets of levers 10, and at opposite ends of the sleeve are secured a series of radial brackets or supports, 15 16, which are each provided with a pair of friction-rollers, 17, between which the extreme rear end of one of the operating-levers 10 passes, so that said rollers can ride on the cam or bent portions of the lever to move the latter on its fulcrum and press the shoe against or withdraw it from the annular friction-rim.

An endwise-movable shipping-rod, 18, has a forked arm, 19, extending therefrom and connected with the sliding sleeve, so that the latter can be conveniently and readily operated. It will be noted that when the shipping-rod is moved in one direction and the sliding sleeve moves therewith one of the sets or series of levers 10 on one side of the sleeve will be adjusted to force their shoes simultaneously and uniformly upon the annular friction-rim of the loose pulley against which the shoes are designed to operate, while the corresponding levers on the other side of the sleeve are moved to retract their shoes from the annular friction-rim, the two friction-brakes being thus adapted to be alternately applied to the loose pulleys, and being capable of assuming a position where neither brake is applied and both pulleys are free.

Having thus fully described my invention, what I claim as new, and desire to secure by Letters Patent, is—

1. In a friction-brake, the combination of a rotary circular part or device, substantially such as described, a series of segmental brake-shoes arranged at intervals around said circular part or device, a series of levers, each pivoted on an independent shaft and connected with one of said brake-shoes, and a sleeve to simultaneously move all of the levers and thereby apply or release all of the brake-shoes, as and for the purpose described.

2. In a friction-brake, the combination of a rotary circular part or device, substantially such as described, a series of segmental brake-shoes arranged at intervals around the periphery of said circular part or device, a series of levers, which are pivotally connected to the brake-shoes, a support common to all of said levers and on which they are all pivotally mounted, and a sleeve for simultaneously moving all of the levers and brake-shoes, as and for the purpose described.

3. In a friction-brake, the combination of a rotary circular part or device, substantially such as described, a series of segmental brake-shoes arranged at intervals around said circular part or device, a series of levers pivotally connected to said brake-shoes, a stationary support common to all of said levers, an adjustable fulcrum for each lever movably connected to said common support, and a sleeve for simultaneously moving all of the levers, as and for the purpose described.

4. The combination of a rotary friction-disk, a series of segmental shoes, a series of levers connected to the shoes, and adjustable fulcrums to which the levers are pivoted, substantially as described.

5. The combination of a rotary friction-disk, a series of segmental shoes, a series of levers pivotally connected with the shoes, and each independently supported in an adjustable fulcrum, a common support, to which all the fulcrums of the levers are secured, and a sliding sleeve for simultaneously adjusting the levers, substantially as described.

6. The combination of a rotary friction-disk, a series of segmental shoes, a series of pivoted levers connected to the shoes and having their opposite ends provided with the cam faces or edges, and a sliding sleeve carrying a series of rollers adapted to ride upon the cam-faces of the levers, substantially as described.

In testimony whereof I have hereunto set my hand this 20th day of February, A. D. 1888.

R. R. SCHNEIDER.

Witnesses:
A. FREDERICK,
PEREY B. SMITH.